United States Patent Office 3,794,559
Patented Feb. 26, 1974

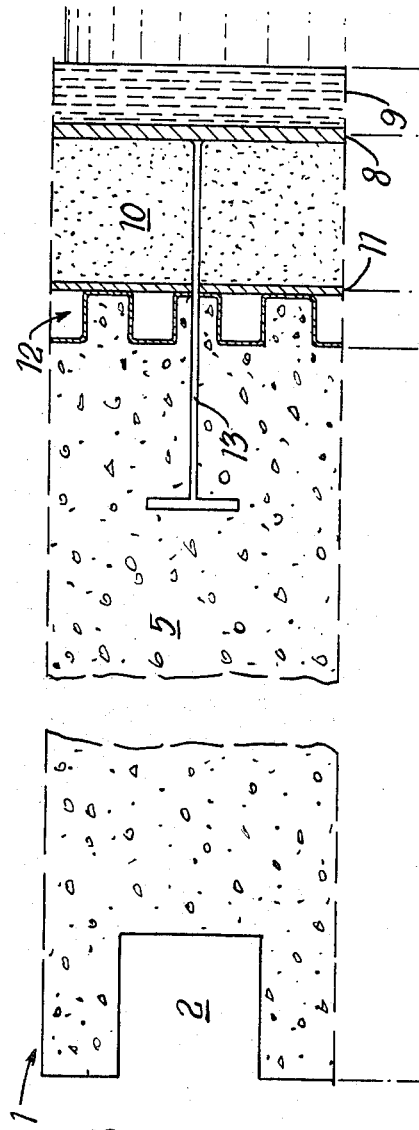

3,794,559
PRESSURE VESSELS
Ivor Llewellyn Davies, High Wycombe, and Reginald Edwin Downton Burrow, London, England, assignors to Taylor Woodrow Construction Limited, Middlesex, England
Filed July 27, 1971, Ser. No. 166,351
Claims priority, application Great Britain, July 29, 1970, 36,797/70
Int. Cl. G21c *13/08*
U.S. Cl. 176—87                                          6 Claims

ABSTRACT OF THE DISCLOSURE

A concrete pressure vessel having a lined cavity for hot, chemically aggressive liquid disposed within a cooling jacket with a layer of material of high thermal conductivity between the cavity liner and the cooling jacket, the jacket and high thermally conductive layer serving to maintain the temperature of the cavity liner within closely controlled limits and the maximum temperature of the main body of the vessel at an acceptable level, and the jacket and the conductive layer also serving to prevent leakage of liquid from the cavity.

---

This invention relates to pressure vessels and is in particular, although not exclusively, concerned with pressure vessels for housing liquid metal cooled nuclear reactors.

According to the present invention there is provided a pressure vessel comprising an outer concrete structure enclosing a lined cavity for containing hot, chemically aggresive liquid, there being between this outer concrete structure and the lined cavity a cooling jacket, and between the cooling jacket and the cavity liner a layer of material of high thermal conductivity that serves to facilitate transfer of heat from the cavity liner to the cooling jacket; the layer of material of high thermal conductivity and the cooling jacket serving, in normal operating conditions, both to maintain the temperature of the cavity liner within closely controlled limits and the maximum temperature of the outer concrete structure at an acceptable level, the liner serving to prevent leakage of liquid from the cavity and the cooling jacket forming an additional impermeable barrier. By "hot" is meant temperatures in excess of about 100° C. In the case of a liquid metal cooled nuclear reactor, the cavity just mentioned receives a pool of liquid sodium that reaches temperatures of the order of 400° C. in normal operation, and the cavity also receives reactor parts that are operated in this pool.

Figure 1:
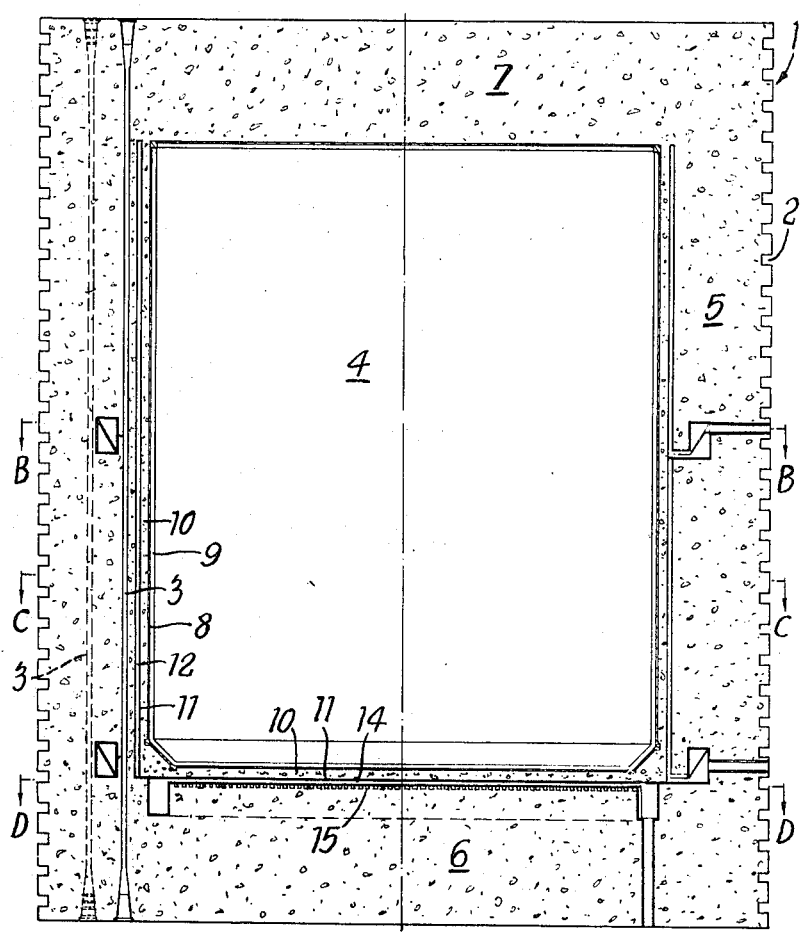
Figure 2:
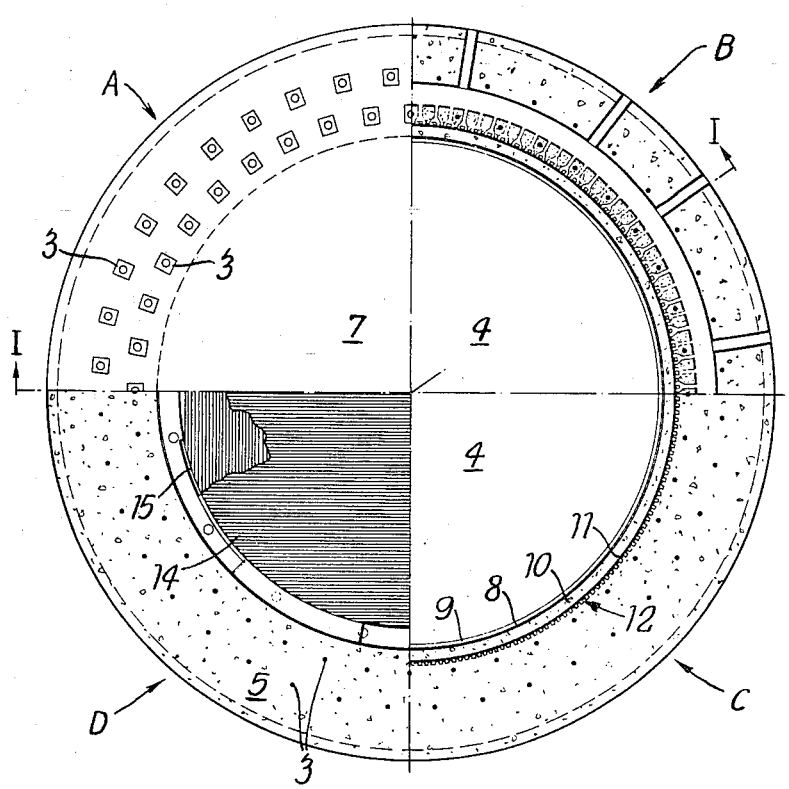

For a better understanding of the invention and to show how the same may be carried into effect, reference will now be made, by way of example, to the accompanying drawings, in which:

FIG. 1 is a sectional side view of a pressure vessel for housing a liquid metal cooled nuclear reactor, taken on the line I—I of FIG. 2, FIG. 2 is a view in plan of the vessel of FIG. 1, the four quarters of this figure, indicated by arrows A, B, C and D, being respectively a top plan view (in the direction of arrow A of FIG. 1) and sectional plan views taken on the lines B—B, C—C and D—D of FIG. 1, FIG. 3 is a sectional view, on a larger scale than FIGS. 1 and 2, of part of a detail of the wall of the vessel of FIGS. 1 and 2, and FIG. 4 is a diagram related to FIG. 3 and illustrating temperature and strain distribution through the wall in operation of a reactor housed in the vessel.

The particular pressure vessel illustrated in FIGS. 1 to 3 is intended to house a liquid metal cooled fast breeder reactor, the liquid metal being sodium. In such a reactor, under maximum steady state operating conditions, the temperature of the sodium coolant is of the order of 400° C. This falls to about 200° C. during refuelling. A gas blanket above the liquid coolant is maintained at a nominal pressure of approximately 20 p.s.i. In addition to this there is a maximum pressure of about 25 p.s.i. arising due to the head of sodium within the pool of sodium. In addition to these factors, the design of a pressure vessel for housing a sodium cooled reactor has to take into account two possible accident conditions, viz:

(1) A so-called "SPERT" or burn-through accident following which molten fuel may fall onto the floor of the cavity housing the reactor and initiate a burn-through fault.

(2) A whole core accident, in which the whole cores disrupts explosively, but following which the reactor will close down permanently.

It is required that in the event of either of these accident conditions occurring, no unacceptable escape of solid or liquid radio-active materials must occur, although some fission product gas may be released from the vessel in which the reactor is housed.

A burn-through accident leads to the ejection of molten fuel into the sodium pool, some of which may be deposited on the floor of the vessel. If a sufficient mass is present at one point, the temperature of the molten lump will rise rapidly and it will burn through any material with which it is in contact. Thus the construction of the vessel must be such that in the event of a burn-through at any point on the base, there is no damage to any vital systems or any serious loss of structural strength. In addition, the thickness of the base and the nature of the foundation structure should offer a maximum opportunity for molten fuel to burn a path downwards without damaging the structure unacceptably or causing uncontrolled leakage of sodium such as to uncover the core. A sufficient depth is required to allow a cool plug of solid sodium to form above the molten fuel lump and thus seal the leak.

In the event of a whole core accident, a liner (described below) provided in the housing vessel must remain intact and the structure of the vessel as a whole must have an adequate margin against collapse.

The vessel of the figures, which in the particular form illustrated is of generally cylindrical form with the axis of the cylinder upright, includes an outer prestressed concrete monolith 1 having troughs or channels 2 formed around its exterior for the reception of prestressing wires (not shown). The monolith 1 can thus be stressed by winding wire under tension in the troughs or channels 2. Alternatively straight or curved tendons (not shown) can be used in place of prestressing wires wound in channels. In addition to this circumferential prestress, vertical prestress is provided by generally upright tendons 3. The monolith 1 encloses a cavity 4 for the sodium pool. In the particular vessel illustrated the cavity 4 is about 50 ft. in diameter and about 60 ft. high. The overall thickness of a curved wall 5 containing the cavity is about 11 ft., a base wall or slab 6 below the cavity has an overall thickness of about 15 ft., and a top cap 7 above the cavity is about 12 ft. thick.

The cavity 4 is surrounded by an inner liner 8, the internal face of which carries an insulating layer 9. This insulating layer (not shown in detail) is in one form made-up of circumferentially extending corrugated metal sheets interleaved with further circumferentially extending corrugated metal sheets the crests of which abut the crests of the first-mentioned corrugated sheets to form upright apertures each defined by a portion of one corrugated sheet and a portion of another corrugated sheet, each such portion extending between an adjacent pair of crests. The sheets are welded or otherwise secured together at their abutting portions so that the apertures form stagnant gas pockets. Individual portions of the insulating layer 9 are welded or otherwise secured together, so that the layer 9 as a whole offers maximum resistance to passage of the sodium, the thermal expansion that occurs when the layer 9 is in contact with the sodium at temperatures of the order of 400° C. being absorbed by flexing of the corrugations. To prevent convection currents in the gas trapped in the pockets of the insulation layer, these pockets can be loosely packed with suitable filling material, for example fused silica or alumina.

The liner 8 is formed of metal, for example mild steel, and is backed by a layer 10 of non-structural concrete composed such as to have a thermal conductivity about double that of normal structural concrete. In order to give high thermal conductivity to this layer 10 of non-structural concrete it may either be loaded with steel shot, stampings, turnings, etc., or a natural mineral aggregate with a high thermal conductivity such as haematite may be used in the formation of the concrete.

The layer 10 of non-structural concrete is separated from the outer, structural concrete of the monolith 1 by a cooling jacket formed by an outer metal liner 11, for example mild steel, the upright, curved part of this liner 11 carrying, on its outer face, an array of ducts 12 for cooling air. These ducts are formed by rectangular corrugated metal troughing secured to the liner 11. Anchor studs 13 buried in the outer structural concrete pass through the outer liner 11 and the layer 10 of non-structural concrete and are secured to the inner liner 8. In an alternative form, not shown, the studs 13 are replaced by ties interconnecting the liners 8 and 11.

In the particular vessel illustrated, the insulation layer 9 is about 5" thick, the inner liner 8 is about 1" thick, the layer 10 of non-structural concrete is about 12" thick, the outer liner 11 is about 3/8" thick and the metal troughing is composed of 4" x 4" troughs. The outer structural concrete is about 9'6" thick.

The base portion of the outer liner 11 carries, on its under surface, two arrays of cooling ducts 14, 15. The array of ducts 14 is formed by corrugated metal troughing secured to the liner 11 as described above. The array of ducts 15 is formed either by troughing secured to a sheet in turn secured to the troughing forming the array of ducts 14, or by square section pipes secured to the troughing forming the array of ducts 14. The relative disposition of the two arrays is such that the ducts 14 and 15 are at right angles to each other. Radio-activity monitoring equipment (not shown) is provided for monitoring the exhaust ends of the arrays of ducts 14 and 15, and valves (also not shown) are provided for isolating single ones, or groups of, the ducts 14 and 15.

It will be apparent that, although not illustrated, the top cap 7 is provided with the necessary structural details required to permit fuelling and other plant requirements.

As already mentioned, under maximum steady state operating conditions of a reactor housed in the particular vessel described, the sodium coolant is at a temperature of the order of 400° C. The construction of the insulation layer 9 is such that this temperature drops, across the insulating layer 9, to about 200° C. (see FIG. 4) and air is passed through the ducts 12 such that, under these conditions, the non-structural concrete layer 10 adjacent the liner 8 is subjected to a very steep thermal gradient by a temperature cross-fall, from 200° C. at the inner liner 8 to 50° C. at the outer liner 11, in a thickness of 12". This temperature of 50° C. drops to 20° C. (ambient) across the thickness of the outer structural concrete.

As also already mentioned, during refuelling the temperature of the sodium coolant drops to about 200° C. and it will be appreciated that a corresponding drop in the temperature of the inner liner 8 would subject this liner to considerable thermal stress. Furthermore, changes in reactor loading during normal operation give rise to fluctuations in the temperature of the sodium, also tending to apply thermal stress to the liner 8. With a view to minimizing the thermal stress applied to the liner 8, the temperature of the air passed through the ducts 12 is regulated to keep the temperature of the liner as near constant as possible. Thus, when first commissioning the reactor, warm air is blown through the ducts 12 until a steady temperature state is reached through the structure and then the cooling system is further adjusted as the temperature of the sodium is raised to the operating level. Thereafter fluctuations in the temperature of the sodium arising from changes in reactor loading are dealt with by adjusting the quantity of cooling air blown through the ducts. During refuelling the temperature of the air passed through the ducts 12 is raised to reduce the overall drop in temperature from the inner liner 8 to the outer liner 11. Typical temperatures achieved are 150° C. at the inner liner 8 and 80° C. at the outer liner 11. The temperature gradient across the outer structural concrete correspondingly increases, the maximum temperature in the structural concrete rising to 80° C. However, temperatures of the order of 50° C. to 80° C. are temperatures of an acceptable level for conventional structural concrete.

If a complete shut-down is necessary and the sodium has to be drained to give access to the reactor, it is necessary to cool the vessel down by carefully controlled procedure corresponding to that adopted for commissioning.

The normal maximum operating conditions of temperature lead to net tensile strains at the outer surface of the vessel of approximately 400 microstrain. The prestress applied by the wires wound in the channels 2 is such as to reduce these strains to zero.

Possible accident conditions have been mentioned above. In the present vessel, if sodium should leak past the insulating layer 9 and the inner layer 8 it comes into contact with the non-structural concrete layer 10. This concerete is such that the sodium will not react with it but sodium may tend to permeate through it. However, since the outer liner 11 is maintained at a temperature below that at which sodium solidifies, any sodium permeating through the concrete layer 10 will solidify upon contacting the linear 11 thereby to seal the leakage.

As described earlier, a "SPERT" or burn-through accident may discharge molten fuel into the sodium pool and some of this may come to rest in the form of lumps on the bottom surface of the cavity 4 where it will burn through the liners and possibly penetrate deeply through the structure and into the foundation below. To minimize the effects of such a burn-through accident the base slab 6 is made generously thick to give ample dimensions to contain the cooling ducts and manifolds and into which personnel access is provided for inspection and maintenance purposes, and to give an additional thickness of concrete through which the molten material must burn before escaping from the primary containment structure. Furthermore, the base slab is mounted on a further thickness of cheaper concrete or a bed of quartz particles to act as a sump in which the thermal energy of the molten fuel may be dissipated.

The small size of the individual cooling ducts limits the escape of excessive quantities of sodium. In addition, the arrangement of two mutually perpendicular arrays of ducts minimises the effect of a burn-through on the cooling of the base slab and provides a direct means of identifying the location of the burn-through utilizing the monitoring equipment mentioned above. The valves, also mentioned above, can be utilized to isolate and close-off the affected ducts once the damage has been located. Thus a selection of closures may be made so that only a small part of the cooling is removed while cooling may be continued over the remainder of the base slab. The continuation of cooling in this way ensures that the outer liner 11 is maintained at a temperature below the solidification temperature of sodium and this will lead to the system becoming self sealing before excessive loss of sodium from the cavity through the "burn-through" hole occurs. The provision of man access to the main air manifolds offers a possibility of reinstating any blocked ducts after an accident. The wire wound prestressing system completely frees the base slab of prestressing tendons, so removing the possibility that a burn-through will damage the prestressing system.

It should be noted that detection apparatus can also be associated with the ducts 12.

Irrespective of the credibility and probability of a whole core accident, the vessel is designed to contain the effects of a whole core accident once only during its life, the structure being designed to accept a stipulated pseudo-static after pressure of 350 p.s.i. It is assumed that the transient high pressure pulse preceding this steady pressure will be resisted by the inertia of the structure.

To contain this accident condition, sufficient prestress is provided to give a load factor against collapse of approximately 1.5. The bonded reinforcement or prestressing tendons 3 are such as to control and distribute the cracking of the concrete and to ensure that width of cracks is held within limits acceptable to the liners. In some areas, where higher local strains occur due to structural discontinuities (e.g. at the vessel corners or penetration connections), additional reinforcement is provided to ensure that the crack widths are specifically controlled.

Although the pressure vessel specifically described is one intended to house a liquid metal cooled reactor, such a pressure vessel can be used to house hot, chemically aggressive liquids other than liquid sodium. It will be appreciated that in all cases the insulating layer 9 will be of a material compatible with the liquid to be housed, and that an insulation layer constructed differently from that described can be provided. Furthermore, the layer 10 of non-structural concrete can be replaced by other suitable heat-conductive material.

A vessel not intended to house a reactor need not, of course, be constructed to be capable of withstanding a whole core accident.

What is claimed is:

1. A pressure vessel comprising an outer concrete structure enclosing a lined cavity for containing hot, chemically aggressive liquid, the lining being constituted by a metal liner, a cooling jacket between said outer structure and said liner, a first layer of a material of high thermal conductivity between the latter and said cooling jacket, formed by non-structural concrete composed such as to have a thermal conductivity of the order of double that of the concrete of said outer structure, and an inner insulating layer on the internal face of said liner, toward said cavity, said layers facilitating transfer of heat, said first layer and said jacket serving, in normal operating conditions, both to maintain the temperature of said liner within closely controlled limits, and the maximum temperature of said outer structure at an acceptable level, said liner serving to prevent leakage of the liquid from said cavity, and said jacket forming an additional impermeable barrier.

2. The pressure vessel as defined in claim 1, wherein the concrete of said first layer is loaded with steel shot, stampings or turnings.

3. The pressure vessel as defined in claim 1, wherein a natural mineral aggregate with a high thermal conductivity is used in the formation of the concrete of said first layer.

4. The pressure vessel as defined in claim 1, wherein said jacket includes an array of ducts through which cooling fluid can be passed.

5. The pressure vessel as defined in claim 4, wherein said jacket has a base portion, and further comprising valves associated with the ducts in said base portion, whereby single ducts, or groups of ducts, can be isolated from the remaining ducts.

6. The pressure vessel as defined in claim 4, wherein said jacket has a base portion, the latter including two arrays of ducts disposed transversely of one another.

References Cited
UNITED STATES PATENTS

| | | | |
|---|---|---|---|
| 3,497,421 | 2/1970 | Thome | 165—136 X |
| 3,548,931 | 12/1970 | Germer | 176—87 |
| 3,424,239 | 1/1969 | Coudray | 176—87 |
| 3,489,206 | 1/1970 | Lecourt | 176—87 |
| 3,175,958 | 3/1965 | Bourgade | 176—87 |
| 3,395,075 | 7/1968 | Hench | 176—87 |
| 3,443,631 | 5/1969 | Bremer et al. | 176—87 |
| 3,605,362 | 9/1971 | Sweeney | 176—87 |
| 3,320,969 | 5/1967 | Gordon | 176—87 |
| 3,258,403 | 6/1966 | Malay | 176—87 |
| 2,853,624 | 9/1968 | Wigner et al. | 176—87 |

FOREIGN PATENTS

| | | | |
|---|---|---|---|
| 1,489,771 | 8/1967 | France | 176—87 |

REUBEN EPSTEIN, Primary Examiner

U.S. Cl. X.R.
152—224; 165—136